(12) United States Patent
Sung et al.

(10) Patent No.: US 11,148,122 B2
(45) Date of Patent: Oct. 19, 2021

(54) SCR CATALYST FOR REMOVING NITROGEN OXIDES AND METHOD FOR PRODUCING SAME

(71) Applicant: Hyundai Heavy Industries Co., Ltd., Ulsan (KR)

(72) Inventors: Sam Kyung Sung, Ulsan (KR); Sang Ek Lee, Ulsan (KR); Do Yun Kim, Ulsan (KR); Hyun Soo Kim, Ulsan (KR); Mong Kyu Chung, Ulsan (KR); Chan Do Park, Ulsan (KR)

(73) Assignees: Korea Shipbuilding & Offshore Engineering Co., Ltd., Seoul (KR); Hyundai Heavy Industries Co., Ltd., Ulsan (KR)

( * ) Notice: Subject to any disclaimer, the term of this patent is extended or adjusted under 35 U.S.C. 154(b) by 0 days.

(21) Appl. No.: 15/744,588

(22) PCT Filed: Jul. 11, 2016

(86) PCT No.: PCT/KR2016/007520
§ 371 (c)(1),
(2) Date: Jan. 12, 2018

(87) PCT Pub. No.: WO2017/010775
PCT Pub. Date: Jan. 19, 2017

(65) Prior Publication Data
US 2018/0200697 A1    Jul. 19, 2018

(30) Foreign Application Priority Data

Jul. 15, 2015   (KR) ........................ 10-2015-0100674

(51) Int. Cl.
*B01J 21/16*   (2006.01)
*B01J 23/30*   (2006.01)
(Continued)

(52) U.S. Cl.
CPC .......... *B01J 23/30* (2013.01); *B01D 53/9418* (2013.01); *B01J 21/06* (2013.01); *B01J 21/16* (2013.01);
(Continued)

(58) Field of Classification Search
CPC ... B01J 23/30; B01J 21/16; B01J 37/08; B01J 37/04; B01J 23/28; B01J 35/0006;
(Continued)

(56) References Cited

U.S. PATENT DOCUMENTS

| 5,415,850 A | 5/1995 | Yang et al. |
| 2014/0170032 A1* | 6/2014 | Yang ................. B01D 53/9413 422/180 |

FOREIGN PATENT DOCUMENTS

| JP | 8-91825 A | 4/1996 |
| JP | 2001-300309 | 10/2001 |

(Continued)

OTHER PUBLICATIONS

Long et al. "Selective catalytic reduction of NO with ammonia over V2O5 doped TiO2 pillared clay catalysts" vol. 24, Issue 1, Jan. 3, 2000, pp. 13-21 (Year: 2000).*

(Continued)

*Primary Examiner* — Haytham Soliman
(74) *Attorney, Agent, or Firm* — Blank Rome LLP

(57) ABSTRACT

A SCR catalyst for removing nitrogen oxides comprises: a carrier prepared from a support in which Ti-PILC is mixed with titania; and a catalyst material on the carrier, wherein the catalyst material contains an active material of a vanadium component and a co-catalyst of a tungsten component. On the basis of the total weight of the catalyst, the support Ti-PILC is contained at 0.01-40 wt %, and the support titania is contained at 50 to 90 wt %. In addition, a method for producing a SCR catalyst for removing nitrogen oxides (Continued)

comprises the steps of: preparing a carrier by using a support in which Ti-PILC is mixed with titania; and supporting a catalyst material on the carrier. The present disclosure provides: a SCR catalyst for removing nitrogen oxides, which has an excellent nitrogen oxide removing performance and a high producing convenience; and a method for producing the same.

10 Claims, 2 Drawing Sheets

(51) Int. Cl.
| | |
|---|---|
| B01J 23/22 | (2006.01) |
| B01J 21/06 | (2006.01) |
| B01J 37/00 | (2006.01) |
| B01D 53/94 | (2006.01) |
| B01J 23/28 | (2006.01) |
| B01J 35/00 | (2006.01) |
| B01J 37/04 | (2006.01) |
| B01J 37/08 | (2006.01) |

(52) U.S. Cl.
CPC ............... *B01J 23/22* (2013.01); *B01J 23/28* (2013.01); *B01J 35/0006* (2013.01); *B01J 37/00* (2013.01); *B01J 37/04* (2013.01); *B01J 37/08* (2013.01); *B01D 2255/20707* (2013.01); *B01D 2255/20723* (2013.01); *B01D 2255/20769* (2013.01); *B01D 2255/20776* (2013.01)

(58) Field of Classification Search
CPC . B01J 21/06; B01J 37/00; B01J 23/22; B01D 53/9418; B01D 2255/20723; B01D 2255/20769; B01D 2255/20707; B01D 2255/20776
USPC .......................................................... 502/84
See application file for complete search history.

(56) References Cited

FOREIGN PATENT DOCUMENTS

| KR | 2000-0020980 | 4/2000 | | |
|---|---|---|---|---|
| KR | 10-2006-0099611 | 9/2006 | | |
| KR | 10-2008-0075145 | 8/2008 | | |
| KR | 10-0979031 | 8/2010 | | |
| WO | WO 2007/055938 A2 | 5/2007 | | |
| WO | WO-2013147465 A1 * | 10/2013 | ......... | B01D 53/9413 |

OTHER PUBLICATIONS

H.J. Chae et al., "Selective Catalytic Reduction of NOx By NH$_3$ Over V2O5/Ti-PILC Catalyst", Journal of the Korean Institute of Chemical Engineers, vol. 38, No. 6, Dec. 2000, pp. 783-790.

* cited by examiner

SCR CATALYST FOR REMOVING NITROGEN OXIDES AND METHOD FOR PRODUCING SAME

TECHNICAL FIELD

The present disclosure relates to a SCR catalyst for removing nitrogen oxides and a method for producing the same, and more particularly, to a SCR catalyst for removing nitrogen oxides, which has an excellent nitrogen oxide removing performance and a high producing convenience; and a method for producing the same.

BACKGROUND ART

Exhaust gases emitted from engines include various hazardous materials such as soot, carbon monoxide (CO), and nitrogen oxides (NOx), and as regulations on amounts of hazardous components emitted tend to be gradually strengthened, various attempts for purifying these hazardous components have been continuously made.

Among them, a selective catalytic reduction (SCR) technology purifies exhaust gases by bringing the exhaust gases into contact with a SCR catalyst, and converts nitrogen oxides (NOx) in the exhaust gases into nitrogen and water which are innocuous to the human body with the help of the SCR catalyst, and then emits nitrogen and water. At this time, ammonia ($NH_3$) or urea is used as a reducing agent, and the reducing agent is sprayed into a catalyst heated at elevated temperature to selectively reduce only nitrogen oxides in exhaust gases.

As a SCR catalyst, a honeycomb catalyst and a catalyst in the form of metal plate have been usually used.

Typically, the SCR catalyst includes an active material which exhibits catalytic activity, a cocatalyst for effects of enhancing catalytic activity or extending the catalyst lifetime, and a powered support which serves to support the active material and the cocatalyst and increase the reaction area by providing a high surface area, and the support powder and the active material are supported on a carrier (substrate) to constitute the SCR catalyst.

As a carrier of the SCR catalyst, titania ($TiO_2$), which is excellent in electron transfer compared to $Al_2O_3$ or zeolite, is usually used. A catalyst composition is usually in the form of oxides of an active metal such as vanadium (V), tungsten (W), molybdenum (Mo), nickel (Ni), iron (Fe), and copper (Cu), and other active metal components and the like are also added in small amounts in order to enhance the temperature range or durability.

As an example, Korean Patent Publication No. 2000-0020980 discloses a SCR catalyst in which vanadium is used as an active material and Ti-pillared interlayer clay (Ti-PILC) is used as a carrier (hereinafter, referred to as "V/PILC catalyst").

In this case, the SCR catalyst is prepared by supporting the catalyst component vanadium on the surface of the Ti-PILC carrier, and then having crystals of the oxide through a heat treatment.

However, there is a need for a SCR catalyst, which has a better nitrogen oxide removing performance and a higher producing convenience to keep pace with the recent continuous increase in demand and the increasingly strengthened environmental regulations.

REFERENCES OF THE RELATED ART

Patent Documents

Prior Art Document 1 of the present disclosure is Korean Patent Publication No. 2000-0020980 and Korean Patent No. 10-0979031.

Technical Problem

In an aspect, the present disclosure is directed to providing a SCR catalyst for removing nitrogen oxides, which may contribute to commercialization due to an excellent nitrogen oxide removing performance and a high producing convenience; and a method for producing the same.

The technical problems which the present disclosure intends to solve are not limited to the technical problems which have been mentioned above, and still other technical problems which have not been mentioned will be apparently understood by a person with ordinary skill in the art from the following description.

Technical Solution

In an aspect, the present disclosure provides a SCR catalyst for removing nitrogen oxides, which includes a support in which Ti-pillared interlayer clay (Ti-PILC) is mixed with titania ($TiO_2$) as a carrier.

In an exemplary embodiment, on the basis of the total weight of the SCR catalyst for removing nitrogen oxides according to the present disclosure, the support Ti-PILC may be contained at 0.01-40 wt %, and the support titania ($TiO_2$) may be contained at 50 to 90 wt %.

In another exemplary embodiment, the SCR catalyst for removing nitrogen oxides according to the present disclosure may include, as a catalyst material on the carrier, an active material of a vanadium ($V_2O_5$) component and a cocatalyst of a tungsten ($WO_3$) component.

In another exemplary embodiment, on the basis of the total weight of the SCR catalyst for removing nitrogen oxides according to the present disclosure, the active material vanadium ($V_2O_5$) may be contained at 0.01-15 wt %, and the cocatalyst tungsten ($WO_3$) may be contained at 0.01 to 15 wt %.

In another exemplary embodiment, to the SCR catalyst for removing nitrogen oxides according to the present disclosure, a cocatalyst selected from the group consisting of cerium (Ce), sulfur dioxide ($SO_2$), iron (Fe), molybdenum (Mo), yttrium (Y), and lanthanides may be further added at 10 wt % or less on the basis of the total weight of the catalyst.

In another aspect, a method for producing a SCR catalyst for removing nitrogen oxides according to the present disclosure comprises the steps of: preparing a carrier by using a support in which Ti-pillared interlayer clay (Ti-PILC) is mixed with titania ($TiO_2$); and supporting a catalyst material on the carrier.

In an exemplary embodiment, the method for producing the SCR catalyst for removing nitrogen oxides according to the present disclosure may support a catalyst material including the active material vanadium ($V_2O_5$) and the cocatalyst tungsten ($WO_3$) in the supporting step.

In another exemplary embodiment, the method for producing the SCR catalyst for removing nitrogen oxides according to the present disclosure may further add one or more cocatalysts selected from the group consisting of cerium (Ce), sulfur dioxide ($SO_2$), iron (Fe), molybdenum (Mo), yttrium (Y), and lanthanides in the supporting step.

In another exemplary embodiment, the method for producing the SCR catalyst for removing nitrogen oxides according to the present disclosure may further include the step of: performing calcination at a calcination temperature of 500° C. to 600° C. after the supporting.

Advantageous Effects

According to the present disclosure, it is possible to provide a SCR catalyst for removing nitrogen oxides, which may contribute to commercialization due to a better nitrogen oxide removing performance and a higher producing convenience; and a method for producing the same.

DETAILED DESCRIPTION OF BEST MODE

Figure 1:
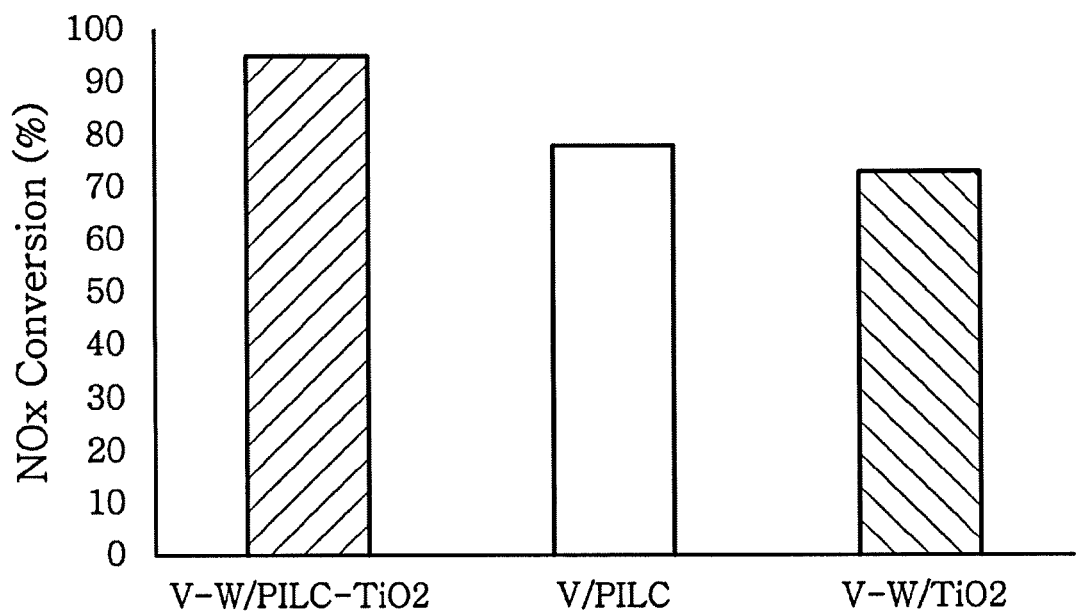
FIGS. 1 and 2 are a graph which compares a nitrogen oxide removing performance measured by using a SCR catalyst according to the Example of the present disclosure with those of SCR catalysts in the related art.

Korean Patent Application No. 10-2015-0100674 filed on Jul. 15, 2015 is hereby incorporated by reference in its entirety for all purposes. Further, the present application claims the benefit of Korean Patent Application No. 10-2015-0100674, which is hereby incorporated by reference in its entirety.

Hereinafter, the present disclosure will be described in detail.

The present disclosure relates to a SCR catalyst used in reducing nitrogen oxides.

In the SCR catalyst, the performance of a carrier along with a role of an active material serves as a main factor to determine the performance of the entire catalyst.

As an example, when a catalyst carrier having high specific surface area and pore volume and a high supporting distribution degree in the case of supporting an active metal is used, a change in physical characteristics as described above may improve the performance of the entire SCR catalyst by enhancing a catalytic activity particularly in a SCR reaction temperature region for removing nitrogen oxides.

From this point of view, the present disclosure provides a SCR catalyst for removing nitrogen oxides, including a support in which Ti-pillared interlayer clay (Ti-PILC) is mixed with titania ($TiO_2$) as a carrier.

It is possible to provide a SCR catalyst for removing nitrogen oxides (hereinafter, referred to as "V-W/PILC-$TiO_2$ catalyst"), including a carrier prepared from a support in which Ti-PILC is mixed with titania ($TiO_2$); and a catalyst material on the carrier by including an active material of a vanadium ($V_2O_5$) component and a cocatalyst of a tungsten ($WO_3$) component as the above-described catalyst material on the carrier, in which the catalyst material contains an active material of a vanadium ($V_2O_5$) component and a cocatalyst of a tungsten ($WO_3$) component.

The carrier included in the "V-W/PILC-$TiO_2$ catalyst" supports the catalyst active component vanadium ($V_2O_5$), and a PILC-$TiO_2$ carrier used in the "V-W/PILC-$TiO_2$ catalyst" may be prepared by mixing titania ($TiO_2$) with Ti-PILC.

Further, when a PILC-$TiO_2$ carrier is prepared by mixing Ti-PILC with titania ($TiO_2$) at an optimum ratio, it is possible to maximize a nitrogen oxide removing performance and a mechanical strength enhancing effect.

From this point of view, the "V-W/PILC-$TiO_2$ catalyst" may contain the support Ti-PILC at 0.01 to 40 wt % and the support titania ($TiO_2$) at 50 to 90 wt %, on the basis of the total weight of the catalyst.

When Ti-PILC is contained at less than 0.01 wt % or titania ($TiO_2$) is contained at less than 50 wt %, an effect of improving nitrogen oxide removing performance and an effect on an increase in mechanical strength are slight, and when Ti-PILC is contained at more than 40 wt % or titania ($TiO_2$) is contained at more than 90 wt %, the ratio with other compositions and the preparation may be affected, so that the ranges are inappropriate.

Further, in a reaction of removing nitrogen oxides on the "V-W/PILC-$TiO_2$ catalyst", vanadium ($V_2O_5$) supported on the above-described PILC-$TiO_2$ carrier acts as a main active site among the catalyst constitutional components. The content of vanadium ($V_2O_5$) supported on the carrier may be 0.01 to 15 wt % on the basis of the total weight.

When the active material is supported at 15 wt % or more, the active material is not uniformly dispersed on the surface of the carrier, and aggregation of the powder occurs due to the high content. In addition, since the active material in excess increases the oxidation power, and as a result, the nitrogen oxide removing performance deteriorates by oxidizing the reducing agent ammonia ($NH_3$) and a side reaction such as ammonium sulfate is caused by oxidizing $SO_2$ to $SO_3$, it is preferred that the active material is supported within a range from 0.01 to 15 wt %.

Furthermore, tungsten ($WO_3$) on the above-described carrier is used as a cocatalyst.

It is preferred that the cocatalyst tungsten ($WO_3$) is contained at 0.01 to 15 wt % in order to exhibit effects of increasing the reaction rate, alleviating sulfur poisoning and enhancing thermal durability.

Further, a cocatalyst such as cerium (Ce), sulfur dioxide ($SO_2$), iron (Fe), molybdenum (Mo), yttrium (Y), and lanthanides (Nos. 57 to 71 elements of the periodic table) may also be further added according to the additionally required conditions such as the reaction temperature or the exhaust gas composition.

Cerium (Ce) is a low-temperature performance enhancing cocatalyst, and may be added at 0.01 wt % or more and 10 wt % or less with respect to the total weight in order to enhance the low-temperature performance within a range not affecting the other composition.

Sulfur dioxide ($SO_2$) is a sulfur-resistance enhancing cocatalyst, and may be added at 0.01 wt % or more and 10 wt % or less with respect to the total weight in order to enhance the sulfur resistance within a range not affecting the other composition.

Iron (Fe) is a low-temperature and high-temperature performance enhancing cocatalyst, and may be added at 0.01 wt % or more and 10 wt % or less with respect to the total weight in order to enhance the low-temperature and high-temperature performance within a range not affecting the other composition.

Molybdenum (Mo) is a high-temperature thermal stability enhancing and poisoning preventing cocatalyst, and may be added at 0.01 wt % or more and 10 wt % or less with respect to the total weight in order to enhance thermal stability at high temperature and prevent poisoning within a range not affecting the other composition.

Yttrium (Y) is a high-temperature thermal stability enhancing cocatalyst, and may be added at 0.01 wt % or more and 10 wt % or less with respect to the total weight in order to enhance thermal stability at high temperature within a range not affecting the other composition.

Elements of lanthanides (Nos. 57 to 71 elements of the periodic table) are cocatalysts which enhance high-temperature thermal stability and enhances a low-temperature and high-temperature performance, and may be added at 0.01 wt % or more and 10 wt % or less with respect to the total weight in order to enhance thermal stability at high temperature within a range not affecting the other composition.

The "V-W/PILC-TiO$_2$ catalyst" described above may be prepared by supporting a raw material catalyst material including vanadium (V$_2$O$_5$) and tungsten (WO$_3$) on a PILC-TiO$_2$ carrier prepared by mixing Ti-PILC with titania (TiO$_2$).

The "V-W/PILC-TiO$_2$ catalyst" prepared as described above may be used while being prepared in various forms such as an extrusion, a coating, a powder, a pellet, and a packing material according to where the catalyst is used.

According to another aspect, the present disclosure provides a method for producing a SCR catalyst for removing nitrogen oxides, including the steps of: preparing a carrier by using a support in which Ti-pillared interlayer clay (Ti-PILC) is mixed with titania (TiO$_2$); and supporting a catalyst material including the active material vanadium (V$_2$O$_5$) and the cocatalyst tungsten (WO$_3$) on the prepared carrier.

Further, in the supporting step, a cocatalyst such as cerium (Ce), sulfur dioxide (SO$_2$), iron (Fe), molybdenum (Mo), yttrium (Y), and lanthanides (Nos. 57 to 71 elements of the periodic table) may also be further added according to the additionally required conditions such as the reaction temperature or the exhaust gas composition.

In addition, in order to remove precursor materials remaining in the catalyst after the supporting, calcination may be performed at 500° C., and the temperature may be increased up to 600° C. in some cases. As a method of increasing the temperature, a known commercially available method (for example, increasing the temperature up to 500° C. at 2° C./min under the air atmosphere, and then maintaining the temperature for 5 hours) may be applied with appropriate modifications.

At this time, when the calcination temperature is less than 500° C., which is too low, the material used as a precursor is not properly removed, and when the calcination temperature is more than 600° C., the high calcination temperature may be responsible for deterioration in durability due to the change (anatase→rutile) in phase of titania (TiO$_2$).

Hereinafter, the present disclosure will be described in more detail through Examples. These Examples are provided only for illustrative purposes, and the scope of the present disclosure is not restrictively interpreted by these Examples.

EXAMPLE

Preparation of "V-W/PILC-TiO$_2$ Catalyst"

A "V-W/PILC-TiO$_2$ catalyst" was prepared according to the following composition.

A raw material catalyst including vanadium oxide (V$_2$O$_5$) and tungsten oxide (WO$_3$) was supported on a catalyst in which Ti-PILC prepared by a known commercially available method was mixed with a support titania (TiO$_2$), and precursor materials remaining in the catalyst after being supported by performing calcination at 500° C. were removed, thereby preparing a "V-W/PILC-TiO$_2$ catalyst".

| Catalyst Composition | |
|---|---|
| Ti-PILC (Support) | 10% |
| Titania (TiO$_2$) (Support) | 84% |
| Vanadium (V$_2$O$_5$) (Active Material) | 3% |
| Tungsten (WO$_3$)(Cocatalyst) | 3% |

Preparation Process and Process Conditions

In the present Example, a process of preparing a "V-W/PILC-TiO$_2$ catalyst" having the aforementioned composition will be specifically exemplified as follows.

First, a method for preparing a PILC-TiO$_2$ carrier by mixing two supports Ti-PILC and TiO$_2$ is as follows.

For a clay material PILC which is a basis of Ti-PILC, an activated sodium bentonite provided by Volclay Ltd. was used as a bentonite including a montmorillonite structure as a main component.

Then, a specific preparation method first prepared a fillering solution at a concentration of 0.7 M Ti by mixing 10 ml of titanium tetraisopropoxide (TTIP) with 40 ml of acetic acid (CH$_3$COOH). A suspension was prepared by dispersing 10 g of PILC in 500 m of water (40 to 50° C.), and was mixed with the fillering solution, thereby creating a 0.1 M Ti concentration atmosphere. And then, NH$_4$OH was slowly added thereto, and the resulting solution was stirred under pH 7 conditions for 24 hours. After stirring, a filtration/cleaning process was performed, and then drying was performed under a 110° C. atmosphere, and the dried sample was slowly warmed up to 350° C. at a heating rate of 2° C./min, and then calcinated at 350° C. for 5 hours. Ti-PILC prepared therefrom was mixed with a commercially available titania (TiO$_2$, anatase) manufactured by A Company, thereby preparing a PILC-TiO$_2$ carrier.

The method for producing a "V-W/PILC-TiO$_2$ catalyst" by supporting V-W on a carrier prepared by mixing the PILC-TiO$_2$ support as described above is as follows.

In the "V-W/PILC-TiO$_2$ catalyst", V-W was prepared by a supporting method which is generally a publicly-known technology on a carrier prepared by mixing a PILC-TiO$_2$ support, and at this time, ammonium metavanadate (NH$_4$VO$_3$) was used as a vanadia precursor. Ammonium metatungstate hydrate [(NH$_4$)$_6$W$_{12}$O$_{39}$·H$_2$O] was used as a precursor for tungsten. Moreover, ammonium molybdate [(NH$_4$)$_6$Mo$_7$O$_{24}$·4H$_2$O] was used as a precursor for molybdenum.

For the preparation process, a vanadia precursor was first weighed at a calculated amount and dissolved in distilled water, and then the pH was adjusted to 2 to 3 by using oxalic acid (COOHCOOH), and after the PILC-TiO$_2$ carrier prepared above was prepared in a powder state, added thereto, and stirred well for 2 hours, water was evaporate by using a rotary evaporator. Furthermore, a V-W/PILC-TiO$_2$ catalyst was produced by drying the PILC-TiO$_2$ carrier at 110° C. for 12 hours, and then performing calcination at 500° C. for 5 hours.

Tungsten was weighed at a required amount, put into distilled water, and then stirred, thereby producing the catalyst. At this time, the catalyst was produced so as to include vanadium and tungsten at a concentration of 3 wt % and 3 wt %, respectively on the catalyst.

Comparative Examples 1 and 2

For comparison with the above Example, a "V/PILC catalyst" in Comparative Example 1 and a "V-W/$TiO_2$ catalyst" currently frequently used as a commercially available catalyst in Comparative Example 2 were prepared by typical methods, and the SCR catalysts in Comparative Examples 1 and 2 were prepared according to the following compositions.

Comparative Example 1

Catalyst Composition of "V/PILC Catalyst"

| | |
|---|---|
| Ti-PILC (Support) | 97% |
| Vanadium ($V_2O_5$) (Active Material) | 3% |

Comparative Example 2

Catalyst Composition of "V-W/$TiO_2$ Catalyst"

| | |
|---|---|
| $TiO_2$ (Support) | 94% |
| Vanadium ($V_2O_5$) (Active Material) | 3% |
| Tungsten ($WO_3$)(Cocatalyst) | 3% |

Experimental Example 1

Confirmation of Nitrogen Oxide Removing Performance

Figure 2:
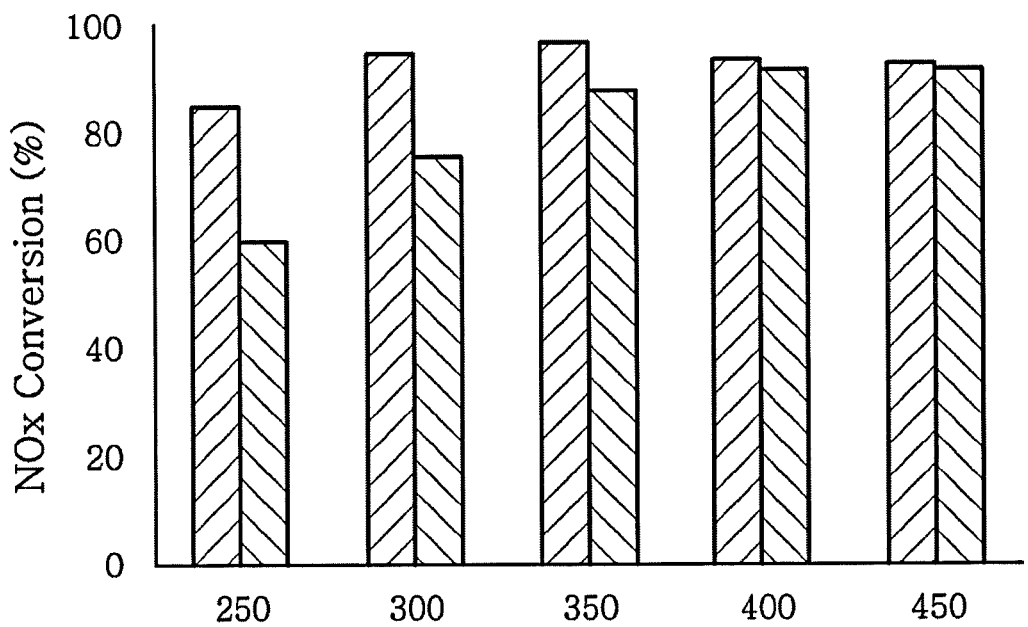

For the "V-W/PILC-$TiO_2$ catalyst" in the Example, the "V/PILC catalyst" in Comparative Example 1, and the "V-W/$TiO_2$ catalyst" in Comparative Example 2, the nitrogen oxide removing activities were measured under the following measurement conditions.
Measurement Conditions
A fixed-based reactor system largely composed of a gas injection part, a reactor, and a reaction gas analyzing part was used, and an efficiency of removing nitrogen oxides of the catalyst was measured through a gas analyzer. The efficiencies of removing nitrogen oxides according to the temperature were measured at the same space speed, and the supplied reaction gas compositions are as follows.
Concentration of Nitrogen oxides ($NO_x$): 1,000 ppm
Concentration of Ammonia ($NH_3$): 1,000 ppm
Concentration of Sulfur dioxide ($SO_2$): 200 ppm
Concentration of Carbon dioxide ($CO_2$): 6%
10% oxygen ($O_2$), 5% moisture ($H_2O$), and $N_2$ balance
Evaluation
FIG. 1 compares nitrogen oxide removing activities in the Example and Comparative Examples 1 and 2 at a specific reaction temperature of 300° C., and FIG. 2 compares nitrogen oxide removing activities in the Example and Comparative Example 2 at each temperature.
As a result, as illustrated in FIGS. 1 and 2, it was confirmed that the "V-W/PILC-$TiO_2$ catalyst" according to the Example had enhanced nitrogen oxide removing performance (15% or more) compared to the "V/PILC catalyst" in Comparative Example 1 and had enhanced nitrogen oxide removing performance (up to 20%) compared to the "V-W/$TiO_2$ catalyst" in Comparative Example 2.

That is, it could be seen that the nitrogen oxide removing activity of the SCR catalyst according to the Example was enhanced by up to 20% compared to the SCR catalysts according to Comparative Examples 1 and 2.

For the operation temperature of the catalyst used in the Example, the catalyst can be operated in a range from 160° C. to 550° C., and a better nitrogen oxide removing performance was shown particularly at 200 to 500° C.

Accordingly, it was confirmed that the "V-W/PILC-$TiO_2$ catalyst" disclosed in the present specification has an effect of improving nitrogen oxide removing performance.

Figure 3:
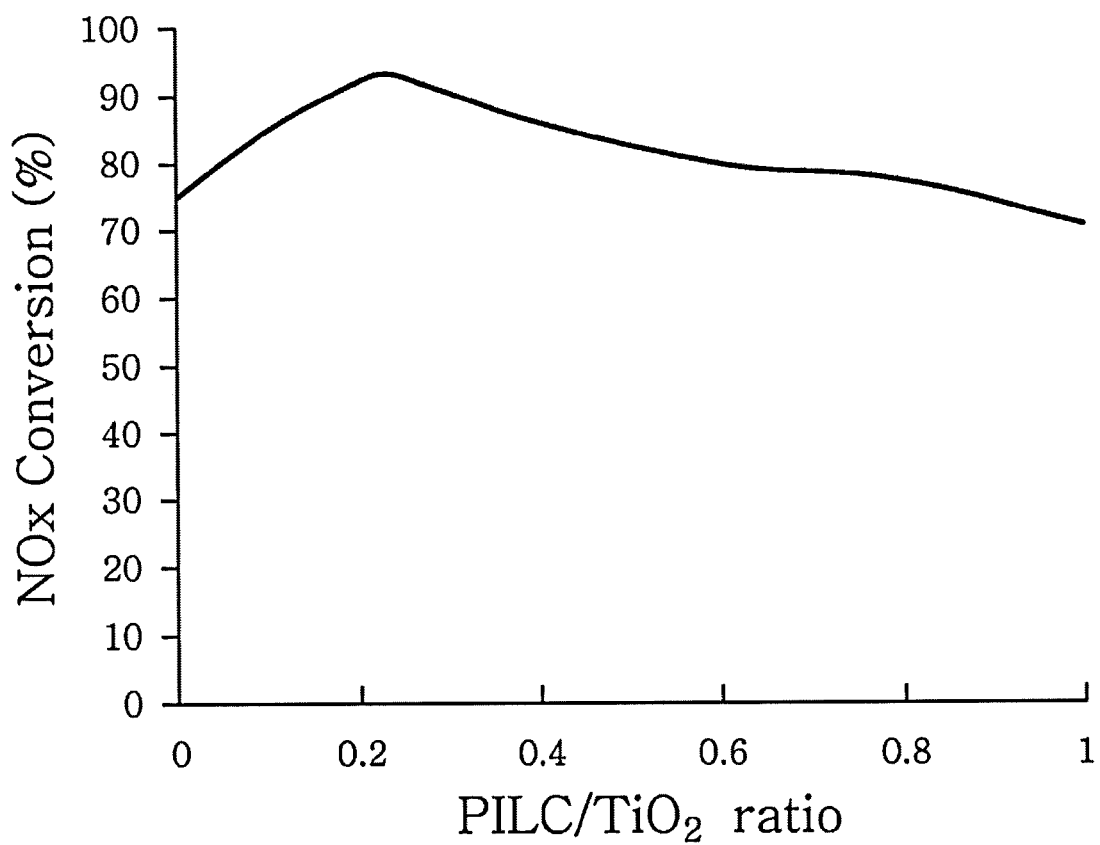
FIG. 3 is a graph illustrating a nitrogen oxide removing performance according to the ratio of Ti-PILC and titania ($TiO_2$) in the SCR catalyst according to the Example of the present disclosure.

Further, as illustrated in FIG. 3, it could be seen that when Ti-PILC and titania ($TiO_2$) was mixed at a ratio of approximately 2:8, the "V-W/PILC-$TiO_2$ catalyst" exhibited the highest level of nitrogen oxide removing performance.

From this point of view, it is preferred that the "V-W/PILC-$TiO_2$ catalyst" contains the support Ti-PILC at 0.01 to 40 wt % and the support titania ($TiO_2$) at 50 to 90 wt %, on the basis of the total weight of the catalyst.

As described above, the "V-W/PILC-$TiO_2$ catalyst" disclosed in the present specification may enhance the nitrogen oxide removing performance and decrease the volume of SCR catalyst used by the enhanced performance, thereby leading to enhancement of cost and product competitiveness.

Experimental Example 2

Confirmation of Compressive Strength

By extruding the "V-W/PILC-$TiO_2$ catalyst" prepared in the Example and the "V/PILC catalyst" and the "V-W/$TiO_2$ catalyst" prepared in Comparative Examples 1 and 2 into the same size, the compressive strengths of the catalysts were measured under the following measurement conditions.
Measurement Conditions
The measurements were performed under the KS L 1601 or DIN 51067 conditions, and as the size of the sample used, 150*150*150 mm (D*W*H) was used.
Evaluation
As a result, as shown in the following Table 1, it could be confirmed that the compressive strength of the SCR catalyst according to the Example was increased by up to 100% compared to the SCR catalysts according to Comparative Examples 1 and 2.

TABLE 1

| Strength (kg/cm²) | Example "V-W/PILC-$TiO_2$ Catalyst" | Comparative Example 1 "V/PILC Catalyst" | Comparative Example 2 "V-W/$TiO_2$ Catalyst" |
|---|---|---|---|
| Direction of flow | 13~15 | 7~13 | 5~10 |
| Direction perpendicular of gas flow | 28~30 | 24~27 | 15~20 |

Accordingly, it was confirmed that the "V-W/PILC-$TiO_2$ catalyst" disclosed in the present specification has an effect of significantly improving mechanical strength.

The configurations of the SCR catalyst for removing nitrogen oxides according to the present disclosure and the method for producing the same are not limited to the above-described Example and may be carried out in various modifications within a range that allows the technical idea of the present disclosure.

The invention claimed is:

1. A SCR catalyst for removing nitrogen oxides, comprising a support in which Ti-pillared interlayer clay (Ti-PILC) is mixed with titania ($TiO_2$) as a carrier, wherein, on the basis of a total weight of the catalyst, the ratio of the support Ti-PILC to the support titania ($TiO_2$) is 0.1 to 0.4.

2. The SCR catalyst for removing nitrogen oxides according to claim 1, wherein a catalyst material on the carrier contains an active material of a vanadium ($V_2O_5$) component and a cocatalyst of a tungsten ($WO_3$) component.

3. The SCR catalyst for removing nitrogen oxides according to claim 2, wherein on the basis of the total weight of the catalyst, the active material vanadium ($V_2O_5$) is contained at 0.01-15 wt %, and the cocatalyst tungsten ($WO_3$) is contained at 0.01 to 15 wt %.

4. The SCR catalyst for removing nitrogen oxides according to claim 1, wherein to the catalyst, a cocatalyst selected from a group consisting of cerium (Ce), sulfur dioxide ($SO_2$), iron (Fe), molybdenum (Mo), yttrium (Y), and lanthanides is further added at 10 wt % or less with respect to the total weight of the catalyst.

5. A method for producing a SCR catalyst for removing nitrogen oxides, the method comprising the steps of:

preparing a carrier by using a support in which Ti-pillared interlayer clay (Ti-PILC) is mixed with titania ($TiO_2$) wherein, on the basis of a total weight of the catalyst, the ratio of the support Ti-PILC to the support titanic ($TiO_2$) is 0.1 to 0.4; and supporting a catalyst material on the carrier.

6. The method according to claim 5, wherein the supporting step supports a catalyst material comprising the active material vanadium ($V_2O_5$) and the cocatalyst tungsten ($WO_3$).

7. The method according to claim 5, wherein to the catalyst, a cocatalyst selected from a group consisting of cerium (Ce), sulfur dioxide ($SO_2$), iron (Fe), molybdenum (Mo), yttrium (Y), and lanthanides is further added in the supporting step.

8. The method according to claim 5, wherein calcination is performed at a calcination temperature of 500° C. to 600° C. after the supporting.

9. The SCR catalyst for removing nitrogen oxides according to claim 1, wherein, on the basis of the total weight of the catalyst, the ratio of the support Ti-PILC to the support titania ($TiO_2$) is 0.25.

10. The method according to claim 5, wherein, on the basis of the total weight of the catalyst, the ratio of the support Ti-PILC to the support titania ($TiO_2$) is 0.25.

* * * * *